United States Patent [19]
Fisher

[11] 3,709,315
[45] Jan. 9, 1973

[54] VEHICLE FOUR WHEEL DRIVING AND STEERING ARRANGEMENT

[76] Inventor: Alfred G. Fisher, 1152 Linbrook Road, Oakville, Ontario, Canada

[22] Filed: May 7, 1970

[21] Appl. No.: 35,494

[52] U.S. Cl. .................................. 180/50, 280/100
[51] Int. Cl. ............................................. B60k 17/34
[58] Field of Search .......... 180/50, 51, 49, 20, 37, 38, 180/42; 280/100, 102, 109

[56] References Cited

UNITED STATES PATENTS

| | | | |
|---|---|---|---|
| 806,947 | 12/1905 | Wyman | 180/38 |
| 971,471 | 9/1910 | Peterson et al. | 180/42 X |
| 1,422,380 | 7/1922 | Schneider | 180/50 |
| 2,474,946 | 7/1949 | Kinslow | 280/109 X |
| 2,839,147 | 6/1958 | Fletcher | 180/20 X |
| 2,928,487 | 3/1960 | Bobard | 180/42 |
| 3,403,745 | 10/1968 | Commons | 180/49 X |

FOREIGN PATENTS OR APPLICATIONS

| | | | |
|---|---|---|---|
| 513,099 | 10/1920 | France | 180/50 |

*Primary Examiner*—Kenneth H. Betts
*Attorney*—Church & Rogers

[57] ABSTRACT

A four wheeled "motor-cycle" type vehicle comprises an elongated body with the motor at the front and a seat at the rear, the driver straddling the body. Two axles carrying the wheels are mounted about steering axes that lie in the same vertical plane and are inclined toward one another, the axles being pivoted simultaneously in opposite directions for steering. Each axle has a respective drive shaft movable therewith and the drive shaft is connected to the motor via a respective driver member, the driver member being connected to the drive shaft via a universal joint located on the respective steering axis.

10 Claims, 7 Drawing Figures

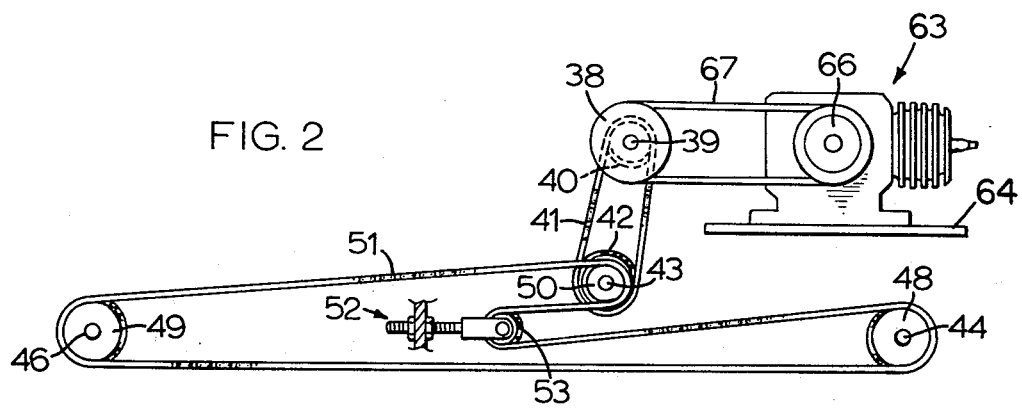
FIG. 2
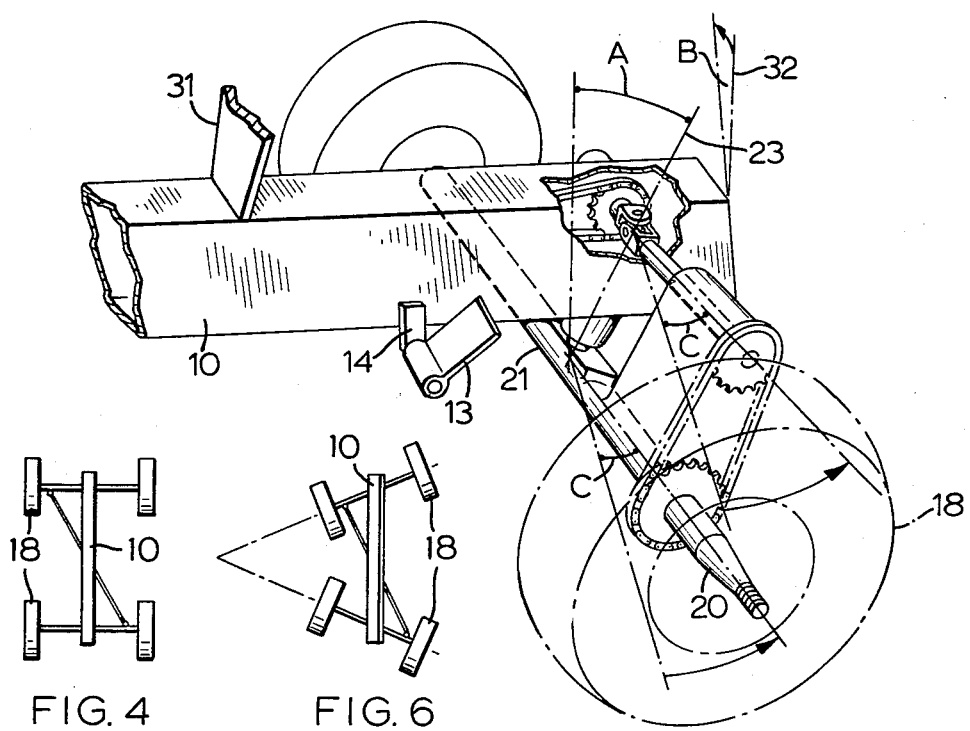
FIG. 3
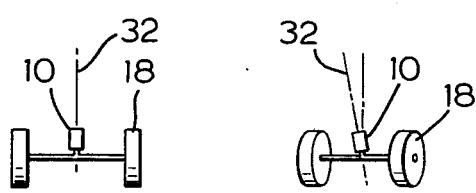
FIG. 4   FIG. 6
FIG. 5   FIG. 7
INVENTOR.
ALFRED G. FISHER
BY Church & Rogers
PATENT AGENTS

VEHICLE FOUR WHEEL DRIVING AND STEERING ARRANGEMENT

FIELD OF THE INVENTION

This invention is concerned with improvements in or relating to four-wheeled vehicles.

DESCRIPTION OF PRIOR ART

There is a continuing and increasing interest in light, inexpensive, rugged vehicles that are suited to all kinds of rough terrain, such as is encountered off the normal roads in backwoods and deserts. For example, in recent years a number of lightweight two-wheeled motorcycles have been developed that are particularly intended for traversing rugged terrains. However, such motorcycles are relatively unstable and are only really suited for use by person of good physique and training, being subject to all the hazards of an ordinary motorcycle, plus the additional hazards provided by the nature of the terrain.

A number of different multi-wheeled (i.e. three or more) vehicles have also been proposed for this purpose. The present applicant is the inventor and patentee in respect of a multi-wheeled vehicle described and claimed in U.S. Letters Patent No. 3,154,045, and is also the inventor in respect of an eight-wheeled articulated vehicle described and claimed in U.S. Letters Patent Ser. No. 3,353,618.

U.S. Patent Ser. No. 569,459 to B.F. Hook shows a sled mounted on two individual runner units wherein the pivot axes of the two units lie in he same central longitudinal plane, and are inclined downwardly toward one another, so that the rider can steer the sled through leaning movements of his body, with the additional possibility of moving one of the runner units by means of a handle.

U.S. Pat. No. 2,269,910 discloses a push truck in which lateral movement of a steering handle simultaneously moves the two axles of the truck in opposite directions to provide steering motion, the operative portions of the steering rod being inclined downwardly toward one another.

U.S. Pat No. 2,535,887 shows a roller skate in which the two pairs of wheels are connected by a diagonal rod, thus linking the two axles on the skate for simultaneous opposite motions as the skate is steered by leaning the weight of the rider.

SUMMARY OF THE INVENTION

Accordingly, it is an object of the present invention to provide a new four-wheeled vehicle, which may be regarded as a form of four-wheeled motor cycle.

It is a more specific object of the invention to provide a four-wheeled vehicle of the kind indicated in the preceding paragraph, wherein all four wheels of the vehicle may be positively driven at all times for increased control and traction.

It is a further object to provide such a vehicle which is particularly simple and rugged in construction, so as to be inexpensive to manufacture and also to withstand the severe abuse encountered in traversing rugged terrains.

In accordance with the present invention there is provided a four-wheeled vehicle comprising a body, two spaced transversely extending axles each carrying a respective pair of wheels with the two wheels of each pair disposed on opposite sides of the body, means mounting the axles to the body for rotation about respective steering axes lying in the same vertical plane and inclined toward one another in the downward direction, a steering member mounted by the body for steering movement under control of a vehicle operator, means connecting the steering member to the said axles to pivot them about their respective steering axes simultaneously in opposite directions for steering the vehicle, the vehicle including means for transmitting power to one of the pair of wheels comprising a drive shaft spaced from the respective axle and movable therewith, drive means connecting the drive shaft and the axle, a universal joint mounted by the body on the respective steering axis to accommodate motion of the drive shaft with the axle, means operatively connecting the drive shaft and the universal joint, a motor mounted by the body, and means operatively connecting the universal joint and the motor.

Also in accordance with the invention there is provided a four-wheeled vehicle comprising a body, two longitudinally spaced combinations of axle and drive shaft mounted to the body, each axle carrying a respective pair of wheels disposed on opposite sides of the body, and each drive shaft being spaced from the respective axle and movable therewith, means pivotally mounting each axle and drive shaft combination to the body for rotation about a respective steering axis, said pivotal mounting means comprising for each combination a universal joint having an input shaft and an output shaft, a first bearing means mounted by the body and mounting the said input shaft in overhanging load-supporting relation thereto, bearing means mounted by the said combination and mounting the said output shaft in overhanging load-supporting relation thereto, the said bearing means mounting the universal joint with its operative center at least approximately on the steering axis, and a single other pivot bearing spaced from the universal joint with its pivot axis on the steering axis and comprising one bearing part mounted by the body and thereby rigidly connected to the universal joint input shaft bearing means, and another bearing part mounted by the combination and thereby rigidly connected to the universal joint output shaft bearing means, said single other pivot bearing permitting movement of the respective axle transverse to the steering axis, drive means operatively connecting each axle to the respective universal joint output shaft, a motor mounted by the body, and drive means operatively connecting each universal joint to the motor to be driven thereby.

DESCRIPTION OF THE DRAWINGS

A particular preferred embodiment of the invention will now be described, by way of example, with reference to the accompanying diagrammatic drawings, wherein:

FIG. 2 is a schematic diagram showing the drive connection between the motor and the vehicle wheels, and FIGS. 3 to 7 are schematic to illustrate the change in position of the various axes of the vehicle parts as it is steered.

DESCRIPTION OF THE PREFERRED EMBODIMENTS

Figure 1:
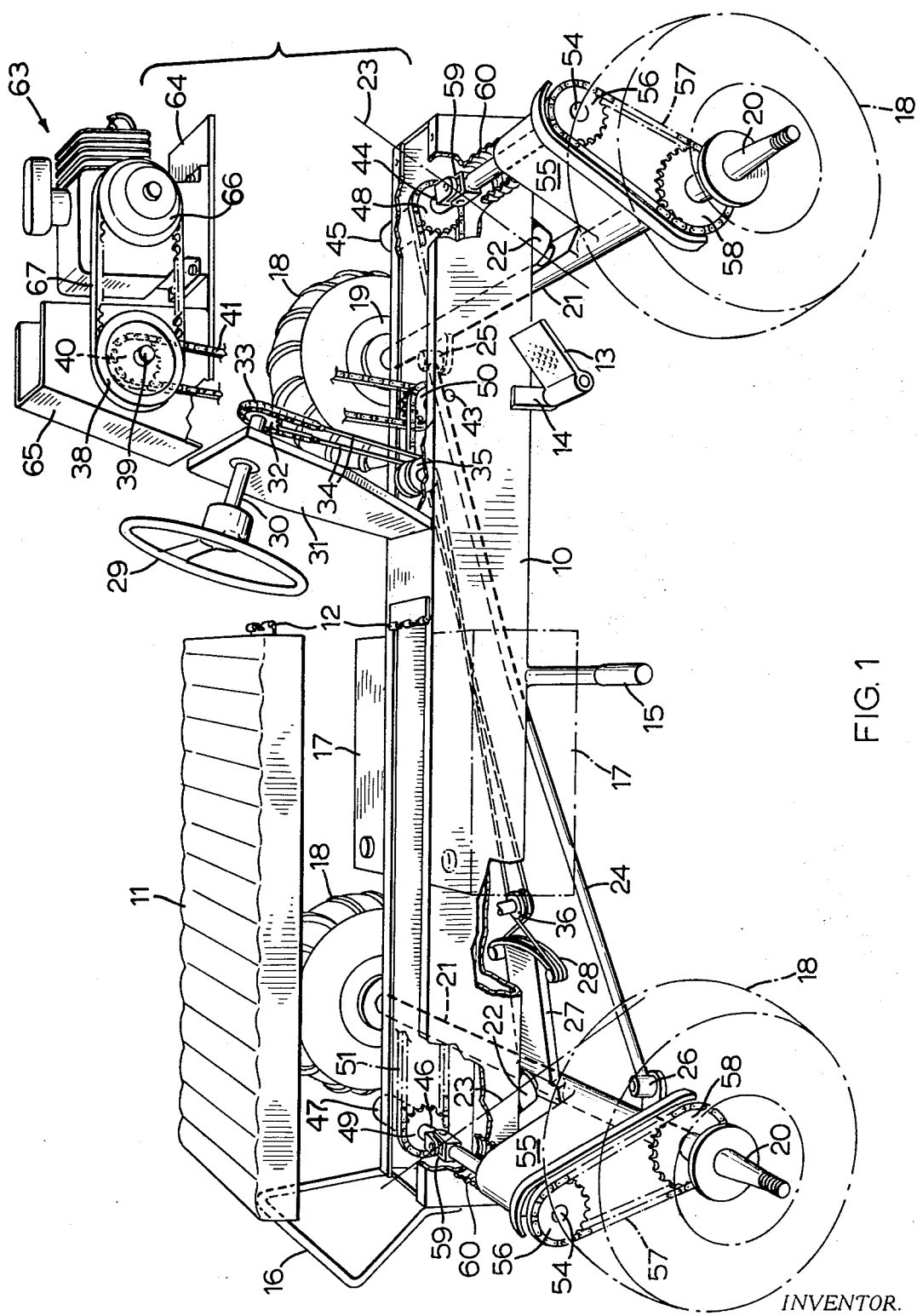
FIG. 1 is a perspective view of the vehicle, partially exploded, and with parts broken away as necessary in order to show the mechanism thereof as clearly as possible.

The vehicle body comprises an elongated hollow tubular member 10, which preferably is of square transverse cross-section, as illustrated. A padded seat 11 is pivotally connected to the body 10 by a hinge 12, and usually is of sufficient length to accommodate in comfort two riders seated one behind the other. The driver sits astride the seat 11 with his feet engaged on left and right hand pedals 13 (only one seen) pivotally mounted on brackets 14 fixed to the body. In known manner the right hand pedal comprises an accelerator control for the vehicle engine, while the left hand pedal (not shown) a brake pedal. A passenger sitting behind the driver rests his (or her) feet on foot rests 15, and can grasp a rear hand rail 16 fastened to the rear of the body for additional security when passing over particularly bumpy terrain. Two interconnected fuel tanks 17 are mounted on opposite sides of the body in a position in which they do not incommode the driver and the passenger.

When intended to be employed as an all-terrain vehicle, the vehicle employs four very wide profile, low-pressure tires 18 (e.g. about 1 – 2 p.s.i.) to give the required traction on soft and marshy ground. With this particular embodiment these tires are preferred for general use because of their cushioning action, to the extent that it is not found necessary to provide any other form of springing for the vehicle, although of course some forms of springing may be provided in other embodiments, and especially in such embodiments using higher-pressure tires.

Each tire 18 is mounted on a respective rim 19 and each pair of wheels is mounted upon a common axle 20 which is rotatably mounted in a respective hollow tube 21. Each tube is mounted by a respective bearing 22 to the underside of the body 10 adjacent opposite ends thereof, about a respective steering axis 23 which is inclined at an angle A (see FIG. 3) to the vertical. The bearing 22 is of a type which will permit limited but definite transverse movements of the tube 21, for a reason to be described below. Each axis passes approximately through the center of the respective axle 20 and tube 21 the two axes lying in the same vertical plane and being inclined toward one another in the downward direction. The left side of the front tube 21 has one end of a tie rod 24 pivotally connected at 25 thereto, while the other end of the tie rod is pivotally connected at 26 to the right side of the other rear tube 21, the connection being such that the two axles are constrained to move simultaneously in opposite rotational directions and by equal angles when either one is moved. A forward extending arm 27 fixed to the rear tube 21 carries a quadrant 28 which is struck about the respective axis 23, while a steering wheel 29, carried by a steering column 30 is rotatably mounted in a partition 31 mounted on the body 10. The steering wheel is operatively connected to the quadrant by means of a sprocket 32 engaged with a drive chain 33, the two ends of the chain being connected by respective cables 34 to the quadrant, the cables passing over pulleys 35 and 36 mounted on the body 10.

Referring now especially to FIGS. 3 to 7, with the two axles 20 at right angles to the longitudinal center lines of the body 10 (as in FIGS. 4 and 5) a vertical center line 32 of the body is vertically upright. When, for example, the vehicle is steered to the left (FIGS. 6 and 7) then the left hand wheels move toward one another, while the right hand wheels move away from one another, longitudinally of the vehicle, so that the two axles point to a common center at a distance from the vehicle, dependent upon the turning radius set by the steering wheel 29. The vehicle therefore steers about a perfect circle whose radius depends upon the inclination of the axles to one another in the horizontal plane. Another effect of the steering action is that the body 10 is inclined to the left out of the vertical plane through an angle (B) as illustrated in FIG. 3, with the result that the driver and passenger both experience a sensation of leaning into the direction of steering, such as is obtained when riding a two-wheeled motor cycle. The riders therefore experience much of the enjoyable sensation that is obtained in driving a motorcycle, while having the stability and safety of a four-wheeled vehicle.

This particular embodiment is arranged to be driven on all four wheels, and this is particularly advantageous in the case of an all-terrain vehicle, the four-wheel drive connection being provided in a simple and exceptionally rugged manner. Referring especially to FIG. 2 the motor 63, comprising a gasoline engine, is mounted by a sub-base 64 on the front end of the vehicle, and usually is enclosed in a suitable covering 65 only part of which is shown. The drive pulley 66 of the engine is connected by a belt 37 to a torque converter 38 mounted as a unit with the engine. Such torque converters are well known, being speed-sensitive, and permit the engine to idle freely at low speed, but become engaged and are able to transmit torque when the engine speed is increased by operation of the accelerator pedal. The torque converter is mounted upon a stub shaft 39 carrying a sprocket 40 which is connected by a primary chain drive 41 to a sprocket 42 mounted on a lay shaft 43 mounted within the interior of the hollow body 10. A forward stub shaft 44 is mounted in the forward part of the body by a bearing 45, so that its axis of rotation passes through the respective steering axis 23, while a rear stub shaft 46 is similarly mounted at the rear end of the body by a bearing 47, so that its axis also passes through its respective steering axis. The two stub shafts 44 and 46 each carry a respective sprocket 48 and 49; these two sprockets and a drive sprocket 50 on the shaft 43 are connected by a single drive chain 51, so that the two stub shafts are rotating simultaneously upon engagement of the torque converter 38. A suitable tensioning arrangement 52 incorporating a sprocket 53 (FIG. 2) is provided within the interior of the body to maintain the main drive chain at the necessary tension.

Each axle 20 has in combination therewith a drive shaft 54, which is securely mounted by respective bearing means in a respective housing 55 fixed to each tube 21 to have its axis of rotation spaced from and parallel to the axis of rotation of the corresponding axle 20. Each drive shaft has a sprocket 56 mounted on the end further from the vehicle body, and connected by a drive chain 57 to another sprocket 58 of larger diameter mounted on the respective axle 20, so that together they constitute a final speed reduction drive. In this particular embodiment the chain 57 is shown open, but in some embodiments this will be enclosed in a suitable housing. The end of each drive shaft 54 nearer to the vehicle body is rigidly connected to a respective universal joint 59 which is mounted so that its operative center is at least approximately on the respective steering axis 23. The universal joint therefore cooperates with the respective bearing 22 in supporting the corresponding axle and drive shaft combination, and is able also to accommodate the movement of the drive shaft through the angle C (see FIG. 3) as the respective axle is moved in the above-described steering motion.

The shaft 44 constitutes an input shaft to the joint 59, the shaft being supported in overhanging load-bearing relation to the vehicle body by its bearing means; similarly the shaft 54 is the universal joint output shaft as well as the drive shaft of the respective axle and drive shaft combination, and is supported by its bearing means in over-hanging load-bearing relation to the housing 55. The bearing 22 comprises one part rigidly connected to the vehicle body and thus connected to the bearing means for the shaft 44, and another part rigidly connected to the tube 21 and thence to the housing 55. The bearing 22 permits limited but definite transverse movements of the tube 21, which movements are produced by the universal joint 59 in its rotation when each pair of wheels has been turned for steering from the "dead-ahead" position, these movements being transmitted via shaft 54 and housing 55 to the tube 21. The universal joint 59 provides the majority of the support for the axle and drive shaft combination on the body, while the purpose of the bearing 22 is principally to maintain the respective axle etc. combination aligned with its steering axis. Such an arrangement obviates the need for a sliding connection between the joint 59 and the shaft 54, which would introduce additional complications. Moreover, since the combination is mounted at only two spaced points, and not three spaced points as has been proposed hitherto, (e.g. by providing a load-bearing knuckle joint straddling a non-load supporting universal joint) it is possible to obtain and maintain adequately precise alignment of those two points on the steering axis within the manufacturing tolerances economically feasible in such a simple machine.

It will now be seen that the vehicle comprises extremely rugged wheel and axle assemblies, while the drive to these wheel and axle assemblies is by means of simple shafts, sprockets and chains which can be of inexpensive robust construction, and are easily serviced in the field, in case of any breakage. Although all four wheels are driven there is no provision for differential action of the wheels as the vehicle is steered, with the result that there is some sideways scrubbing of the tires as the vehicle turns. However, because of the very light weight of the machine, and the considerably reduction in cost, complexity and ease of maintenance that is achieved by the omission of a differential, this disadvantage is completely acceptable in this particular embodiment. In other embodiments a differential can be provided, for example, between each sprocket 58 and two separate parts of the axle 20. Each junction between the body 10 and a casing 55 is enclosed by a flexible rubber sleeve 60.

In the specific embodiment described above the two angles A are at least approximately equal, and usually are in the range 20° – 45°, preferably about 30°. The amount of the above-described sideways tire scrubbing can be reduced by making the two angles A unequal; in a specific range of examples the front angle A is in the range 20° – 45°, preferably about 30°, while the rear angle A is in the range 40° – 50°, preferably 45°. In other embodiments the front angle A may be greater than the rear angle, the specific choice being dependent, for example, on the weight distribution of the vehicle between the front and rear wheel assemblies.

In another modification intended to reduce sideways scrubbing the link 24 is connected asymmetrically to the two tubes 21, for example, the connection 25 is further from or nearer to respective axis 23 than is the connection 26 from its axis 23, so that the two axles do not turn through equal angles C as the vehicle is steered. As with the adjustment of the angles A, the adjustment of the link to produce unequal angles C will depend upon factors such as the vehicle weight distribution. In some embodiments the connections 25 and 26 may be movable along the tubes 21 so that the ratio can be adjusted as required, e.g. to change from a configuration suitable for a solo driver to one more suited to a driver plus passenger and luggage; such a modification will require the link 24 to be adjustable in length. In general, a change in the ratio of between 5 and 10 percent will not be readily detectable, and changes greater than about 30 percent are not desired, with the preferred change being about 20 percent.

It will be noted that the front and rear wheel assemblies are almost identical in construction, permitting the duplication of very many of the components that are employed. The inclination of the steering axis, besides providing the above-described leaning action during steering, also provides a strong self-centering action which tends to restore the vehicle wheels to the "straight-ahead" position.

Other special features of a vehicle in accordance with the present invention, and more particularly this specific embodiment, are as follows:

a. The vehicle comprises a four-wheel drive system in which only two universal joints serve four wheels, resulting in a minimum number of components.

b. The provision of a combination of controlled steering and leaning that shifts the center of gravity toward the center of the steering circle thus permitting faster, safer cornering.

c. The provision of a controlled steering system that actuates both front and rear axles for smaller turning radii than a single axle with same relative movement on same wheelbase.

d. The provision of a final reduction drive in the power train, wherein the larger driven sprocket is mounted close to one of the wheels to improve the ground clearance in the center where it is more significant.

As indicated above, specific embodiments only of the invention have been described, and variations are possible within the scope of the appendant claims.

What I claim is:

1. A four-wheeled vehicle comprising a body, two spaced transversely extending axles each carrying a respective pair of wheels with the two wheels of each pair disposed on opposite sides of the body, means mounting the axles to the body for rotation about respective steering axes lying in the same vertical plane and inclined toward one another in the downward direction, a steering member mounted by the body for steering movement under control of a vehicle operator, means connecting the steering member to the said axles to pivot them about their respective steering axes simultaneously in opposite directions for steering the vehicle, the vehicle including means for transmitting power to one of the pair of wheels comprising a drive shaft spaced from the respective axle and movable therewith, drive means connecting the drive shaft and the axle, a universal joint mounted by the body on the respective steering axis to accommodate motion of the drive shaft with the axle, means operatively connecting the drive shaft and the universal joint, a motor mounted by the body, and means operatively connecting the universal joint and the motor.

2. A vehicle as claimed in claim 1 including means for transmitting power to the other of said pair of wheels, wherein said other axle has a respective drive shaft movable therewith, another universal joint mounted by the body and operatively connected to said respective drive shaft and means operatively connecting said another universal joint to said motor to be driven thereby.

3. A vehicle as claimed in claim 2, wherein each drive shaft axis is parallel to its respective axle axis and said drive means comprises a speed reduction chain drive having a sprocket on each of the shaft and the axle and connected by a drive chain.

4. A vehicle as claimed in claim 2, wherein the said vehicle body is hollow and said means operatively connecting each said universal joint to said motor comprises a single drive chain enclosed within the body.

5. A vehicle as claimed in claim 1, wherein one of the steering axes is inclined to the vertical in the range 20° to 45° and the other steering axis is inclined to the vertical in the range 40° to 50°.

6. A vehicle as claimed in claim 5, wherein the said one steering axis is inclined to the vertical about 30° and the other steering axis is inclined to the vertical about 45°.

7. A four-wheeled vehicle comprising an elongated hollow body, a seat mounted to the rear of the body, a motor mounted to the front of the body, a steering member mounted to the body between the seat and the motor, two spaced transversely-extending axles each carrying a respective pair of wheels with the two wheels of each pair disposed on opposite sides of the body, means mounting the axles to the body for rotation about respective steering axes lying in the same vertical plane and inclined toward one another in the downward direction, means connecting the steering member to the said axles to pivot the latter about their respective steering axes simultaneously in opposite directions for steering the vehicle, a drive shaft extending from the body, drive means operatively connecting the drive shaft and a respective axle, a universal joint mounted by the body on the respective steering axis to accommodate motion of the drive shaft with the axle, and drive connecting means within the body including the universal joint and operatively connecting the motor and the drive shaft.

8. A vehicle as claimed in claim 7, including a drive shaft for each axle and wherein means operatively connecting each drive shaft to the motor vehicle comprise a respective universal joint mounted by the body with the operative center thereof at least approximately on the respective steering axis to accommodate movement of the drive shaft with its respective axle.

9. A four-wheeled vehicle comprising a body, two longitudinally spaced combinations of axle and drive shaft mounted to the body, each axle carrying a respective pair of wheels disposed on opposite sides of the body, and each drive shaft being spaced from the respective axle and movable therewith, means pivotally mounting each axle and drive shaft combination to the body for rotation about a respective steering axis, said pivotal mounting means comprising for each combination a universal joint having an input shaft and an output shaft, a first bearing means mounted by the body and mounting the said input shaft in overhanging load-supporting relation thereto, bearing means mounted by the said combination and mounting the said output shaft in overhanging load-supporting relation thereto, the said bearing means mounting the universal joint with its operative center at least approximately on the steering axis, and a single other pivot bearing spacerom spaced from the universal joint with its pivot axis on the steering axis and comprising one bearing part mounted by the body and thereby rigidly connected to the universal joint input shaft bearing means, and another bearing part mounted by the combination and thereby rigidly connected to the universal joint output shaft bearing means, said single other pivot bearing permitting movement of the respective axle transverse to the steering axis, drive means operatively connecting each axle to the respective universal joint output shaft, a motor mounted by the body, and drive means operatively connecting each universal joint to the motor to be driven thereby.

10. A vehicle as claimed in claim 9, wherein each drive shaft axis is parallel to its respective axle axis, and said drive means comprises a speed reduction chain drive having a sprocket on each of the shaft and the axle and connected by a drive chain.

* * * * *